United States Patent
Patil et al.

(10) Patent No.: US 11,013,053 B2
(45) Date of Patent: May 18, 2021

(54) METHOD AND SYSTEM FOR STATELESS NETWORK FUNCTION SERVICES IN 5G NETWORKS

(71) Applicant: Verizon Patent and Licensing Inc., Arlington, VA (US)

(72) Inventors: Sudhakar Reddy Patil, Flower Mound, TX (US); Niranjan B. Avula, Frisco, TX (US); Gerardo S. Libunao, Manalapan, NJ (US); Sagiv Draznin, Walnut Creek, CA (US); Lalit R. Kotecha, San Ramon, CA (US); Imtiyaz Shaikh, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 16/214,547

(22) Filed: Dec. 10, 2018

(65) Prior Publication Data
US 2020/0187290 A1   Jun. 11, 2020

(51) Int. Cl.
*H04W 88/18* (2009.01)
*H04W 76/25* (2018.01)
*H04L 29/08* (2006.01)
*H04W 92/24* (2009.01)

(52) U.S. Cl.
CPC .......... *H04W 76/25* (2018.02); *H04L 67/142* (2013.01); *H04W 88/18* (2013.01); *H04W 92/24* (2013.01)

(58) Field of Classification Search
CPC ...... H04W 88/18; H04W 76/25; H04L 67/142
USPC .......................................................... 370/328
See application file for complete search history.

(56) References Cited

U.S. PATENT DOCUMENTS

| | | | |
|---|---|---|---|
| 2004/0047328 A1* | 3/2004 | Proctor, Jr. ........... | H04W 52/12 370/342 |
| 2009/0003268 A1* | 1/2009 | Kesavan ............... | H04W 76/25 370/328 |
| 2013/0246641 A1* | 9/2013 | Vimpari ................. | H04L 47/10 709/228 |
| 2018/0376445 A1* | 12/2018 | Yoon ...................... | H04W 8/20 |

* cited by examiner

*Primary Examiner* — Angel T Brockman

(57) ABSTRACT

Systems and methods described herein provide stateless network functions for a wireless core network. A network device in the wireless core network receives, from a network function instance in a set of network function instances, context information and state maintenance parameters for an end device. The state maintenance parameters include one or more timer values for the end device, and an action to be performed upon expiry of the one or more timer values. The network device stores the context information and the state maintenance parameters, and applies the state maintenance parameters to the context information for the end device. The network device performs the action when expiry of the one or more timer values is detected.

20 Claims, 9 Drawing Sheets

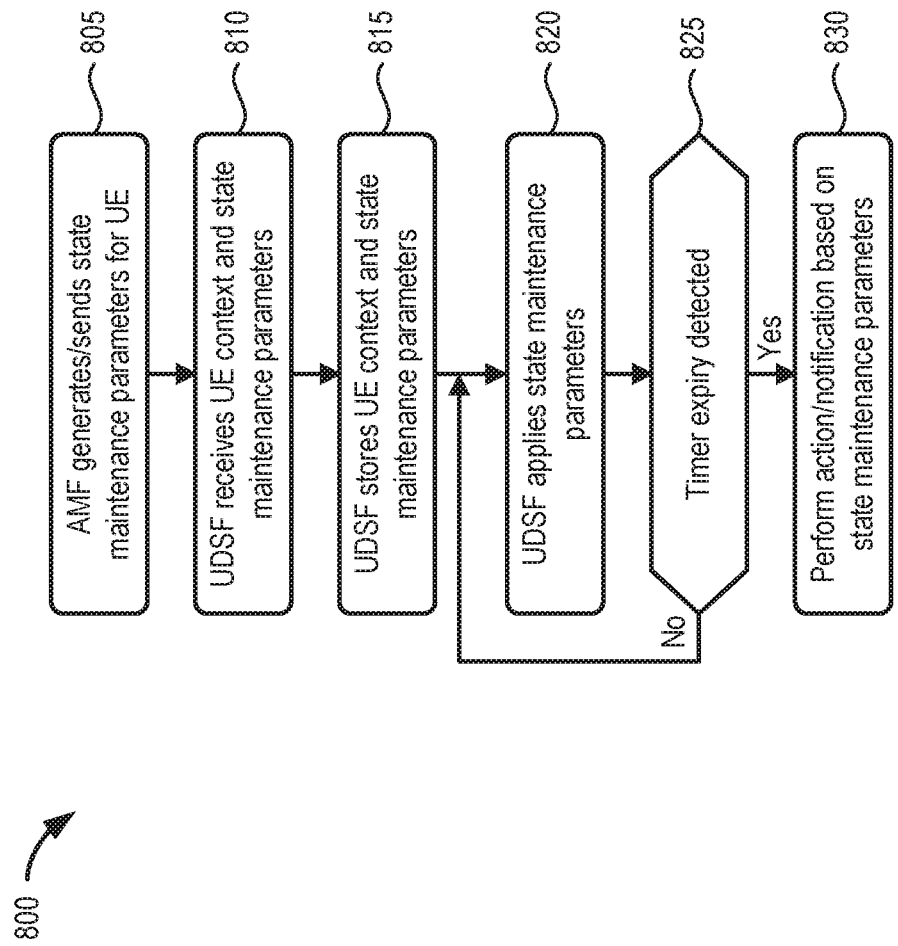

METHOD AND SYSTEM FOR STATELESS NETWORK FUNCTION SERVICES IN 5G NETWORKS

BACKGROUND

Fifth Generation (5G) networks may use different frequencies, different radio access technologies, and different core network functions that can provide an improved experience over legacy wireless networks (e.g., Fourth Generation (4G) networks). Optimal uses of new features available through 5G networks continue to be explored. For example, 5G networks are intended to be deployed using web scale and cloud native technologies. To take advantage of such deployment environments, 5G network functions and services need to rely on stateless processing models with states being stored external to processing elements themselves.

BRIEF DESCRIPTION OF THE DRAWINGS

FIG. 8 is a flow diagram illustrating an exemplary process for implementing a stateless network function service, according to implementations described herein.

DETAILED DESCRIPTION OF THE PREFERRED EMBODIMENTS

Figure 1:
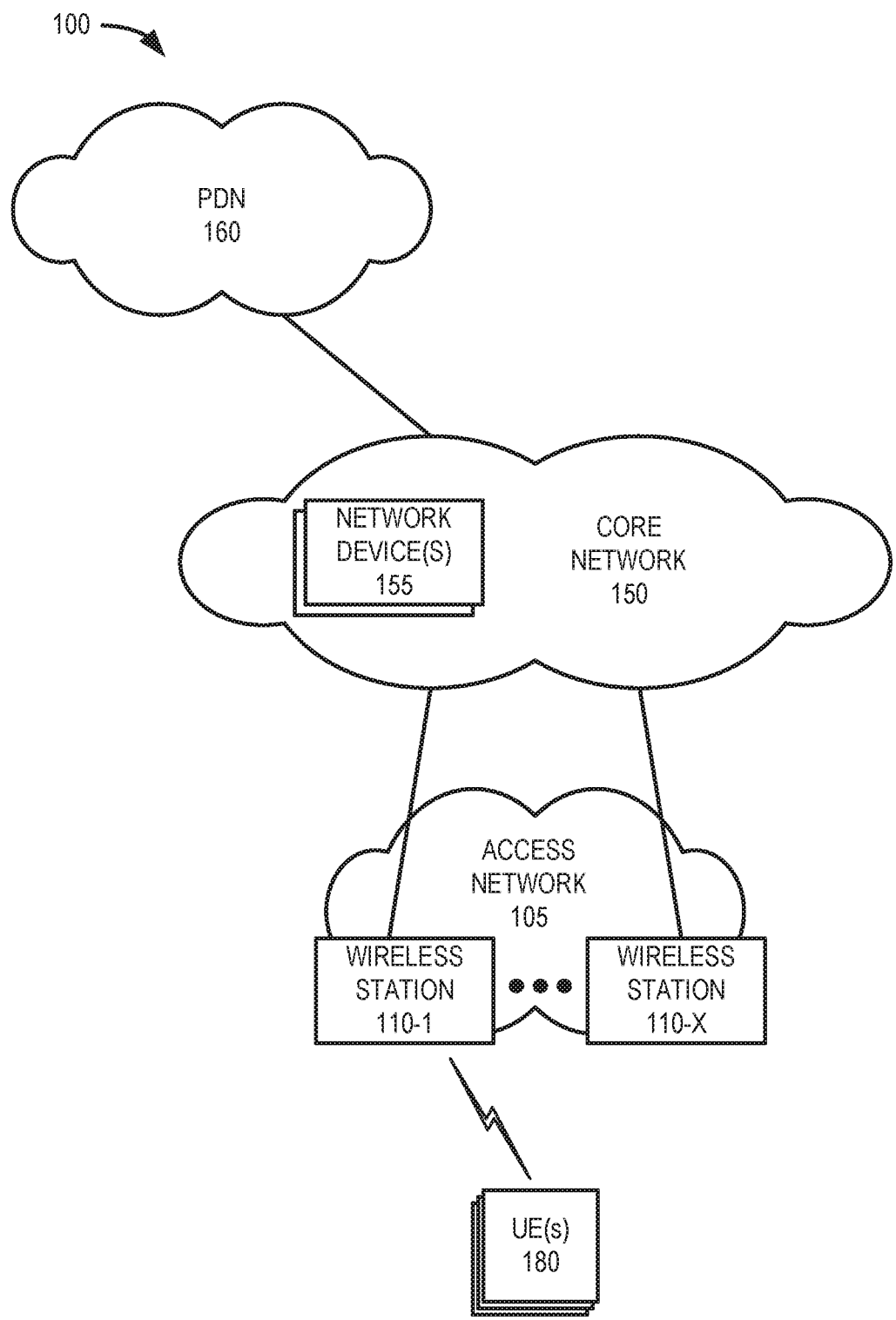
FIG. 1 is a diagram illustrating an exemplary environment in which an exemplary embodiment of a stateless network function service may be implemented.

The following detailed description refers to the accompanying drawings. The same reference numbers in different drawings may identify the same or similar elements. Also, the following detailed description does not limit the invention.

For 5G networks, procedures for each end device (also referred to as user equipment or a "UE") are handled within an Access and mobility Management Function (AMF) set. The AMF set may include several AMF instances. An AMF instance handles UE procedures and typically needs to create and maintain context/state for the UE. When a UE registers with the network, the AMF instance handling the UE's request creates a UE context. This context is required for all subsequent procedures related to the UE, such as handovers and idle/active mode transitions. According to implementations described herein, after an AMF instance completes a procedure for the UE, the AMF instance may store UE context in an Unstructured Data Storage Function (UDSF).

A subsequent request related to the UE can be routed by a wireless station (such as a next generation Node B or "gNB") to any of the AMF instances within the same AMF set. The AMF instance that receives this subsequent request may retrieve the UE context from the UDSF, perform the requested procedure, and then store the UE context back in the UDSF. This model allows for dynamic introduction of AMF instances into the AMF set, simplifies maintenance aspects, enables relocation of AMF instances, and permits load balancing across all AMF instances without impacting UE contexts. Using this model, high resiliency for each individual AMF instance is not required. However, the UDSF, as the repository for UE contexts, needs to support higher resiliency and availability. In Webscale colloquial terminology, each AMF instance can be treated as "cattle," while the UDSF would be treated as a "pet."

Under current 5G network standards (e.g., 3GPP standards), the UDSF is treated as a pure context/state store and does not support any actions to be performed on UE contexts on its own. The service that the UDSF provides allows network function instances to store, retrieve, update and delete contexts. However, in many cases, the UE context tends to be associated with one or more timers. For example, an AMF is required to run timers to monitor re-registration of the UE Similarly, other network functions, such as session management functions (SMFs), may have a specific set of timers that need to be run related to a UE context. As 5G networks continue to develop, there could be other timers that need to be run on the UE context. Currently, the UDSF is not designed to run UE context-related timers but, instead, simply stores the UE context. Even if others parts of a UE context are stored by the UDSF, network functions such as the AMF and SMF cannot be stateless while maintaining timers for UE context.

Systems and methods described herein provide a stateless network function service for 5G cellular networks. More particularly, the systems and methods enhance the UDSF to support context-related characteristics that the UDSF needs to fulfil so that stateless network functions, such as AMF instances, are not required to maintain timers for UE context. According to one implementation, a network device in the wireless core network receives, from a network function instance in a set of network function instances, context information and state maintenance parameters for an end device. The state maintenance parameters include one or more timer values for the end device, and an action to be performed upon expiry of the one or more timer values. The network device stores the context information and the state maintenance parameters, and applies the state maintenance parameters to the context information for the end device. The network device performs the action when expiry of the one or more timer values is detected.

FIG. 1 is a diagram illustrating an exemplary environment 100 in which an embodiment of the stateless network function service may be implemented. As illustrated, environment 100 includes an access network 105, a core network 150, and a packet data network (PDN) 160. Access network 105 may include wireless stations 110-1 through 110-X (referred to collectively as wireless stations 110 and individually (or generally) as wireless station 110). Core network 150 may include network devices 155 that provide network functions for stateless network function services described herein. Environment 100 further includes one or more UEs 180.

The number, the type, and the arrangement of network devices, and the number of UEs 180, are exemplary. A network device, a network element, or a network function (referred to herein simply as a network device) may be implemented according to one or multiple network architectures, such as a client device, a server device, a peer device, a proxy device, a cloud device, a virtualized function, and/or another type of network architecture (e.g., Software Defined Networking (SDN), virtual, logical, network slicing, etc.). Additionally, a network device may be implemented according to various computing architectures, such as centralized, distributed, cloud (e.g., elastic, public, private, etc.), edge, fog, and/or another type of computing architecture.

Environment 100 includes communication links between the networks, between the network devices, and between UEs 180 and the network devices. Environment 100 may be implemented to include wired, optical, and/or wireless communication links among the network devices and the networks illustrated. A connection via a communication link may be direct or indirect. For example, an indirect connection may involve an intermediary device and/or an intermediary network not illustrated in FIG. 1. A direct connection may not involve an intermediary device and/or an intermediary network. The number and the arrangement of communication links illustrated in environment 100 are exemplary.

Access network 105 may include one or multiple networks of one or multiple types and technologies. For example, access network 105 may include a Fifth Generation (5G) radio access network (RAN), a Fourth Generation (4G) RAN, a 4.5G RAN, and/or another type of RAN. By way of further example, access network 105 may be implemented to include an Evolved UMTS Terrestrial Radio Access Network (E-UTRAN) of a Long Term Evolution (LTE) network, an LTE-Advanced (LTE-A) network, an LTE-A Pro network, and/or a next generation (NG) RAN. According to various exemplary embodiments, access network 105 may be implemented according to various architectures of wireless service, such as, for example, macrocell, microcell, femtocell, or other configuration. Additionally, according to various exemplary embodiments, access network 105 may be implemented according to various wireless technologies (e.g., radio access technology (RAT), etc.), wireless standards, wireless frequencies/bands, and so forth.

Depending on the implementation, access network 105 may include one or multiple types of wireless stations 110. For example, wireless station 110 may be implemented as a next generation Node B (gNB), an evolved Node B (eNB), an evolved Long Term Evolution (eLTE) eNB, a small cell node (e.g., a picocell device, a femtocell device, a microcell device, a home eNB, a repeater, etc.), or another type of wireless node (e.g., a WiFi device, a WiMax device, a hot spot device, etc.) that provides a wireless access service.

Core network 150 may include one or multiple networks of one or multiple network types and technologies to support access network 105. For example, core network 150 may be implemented to include a next generation core (NGC) network, an Evolved Packet Core (EPC) of an LTE network, an LTE-A network, an LTE-A Pro network, and/or a legacy core network. Depending on the implementation, core network 150 may include various network devices 155, such as for example, a user plane function (UPF), an access and mobility management function (AMF), a session management function (SMF), a unified data management (UDM) device, a UDSF (which may be integral with the UDM device), an authentication server function (AUSF), a network slice selection function (NSSF), a network repository function (NRF), a policy control function (PCF), and so forth. According to other exemplary implementations, core network 150 may include additional, different, and/or fewer network devices 155 than those described. For purposes of illustration and description, network devices 155 may include various types of network devices that may be resident in core network 150, as described herein.

PDN 160 may include one or more networks, such as a local area network (LAN), a wide area network (WAN), a metropolitan area network (MAN), a telephone network, the Internet, etc., capable of communicating with UE 180. In one implementation, PDN 160 includes a network that provides data services (e.g., via packets or any other Internet protocol (IP) datagrams) to UE 180. Depending on the implementation, PDN 160 may include various network devices that provide various applications, services, or other type of end device assets, such as servers (e.g., web, application, cloud, etc.), mass storage devices, data center devices, and/or other types of network devices pertaining to various network-related functions.

UE 180 may include any mobile device configured to communicate with wireless station 110 via wireless signals. For example, UE 180 may include a portable communication device (e.g., a mobile phone, a smart phone, a global positioning system (GPS) device, and/or another type of wireless device); a telephone terminal; a personal computer or workstation; a server device; a laptop, tablet, or another type of portable computer; a media playing device; a portable gaming system; and/or any type of mobile device with wireless communication capability. Each UE 180 may typically be associated with a subscriber, and the subscriber may be associated with a wireless account managed by a service provider for access network 105. According to an implementation, UE 180, or applications executed thereon, may require state information to support ongoing communications through core network 150. For example, various timers may be used by core network 150 to manage UE 180 connections and idle periods.

Figure 2A:
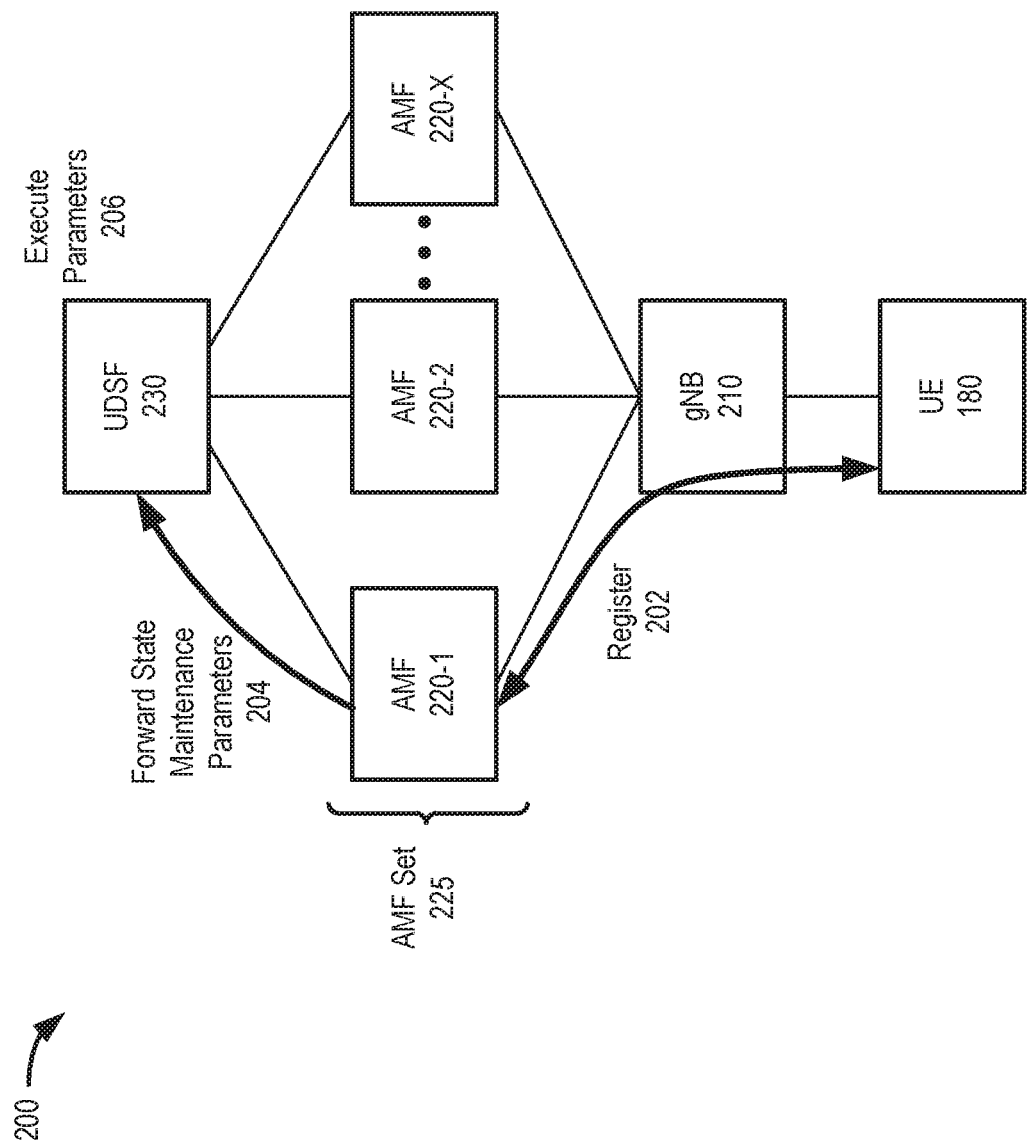
FIGS. 2A and 2B are diagrams illustrating an exemplary process of an embodiment of the stateless network function service in a portion of the network environment of FIG. 1, according to an implementation.
Figure 2B:
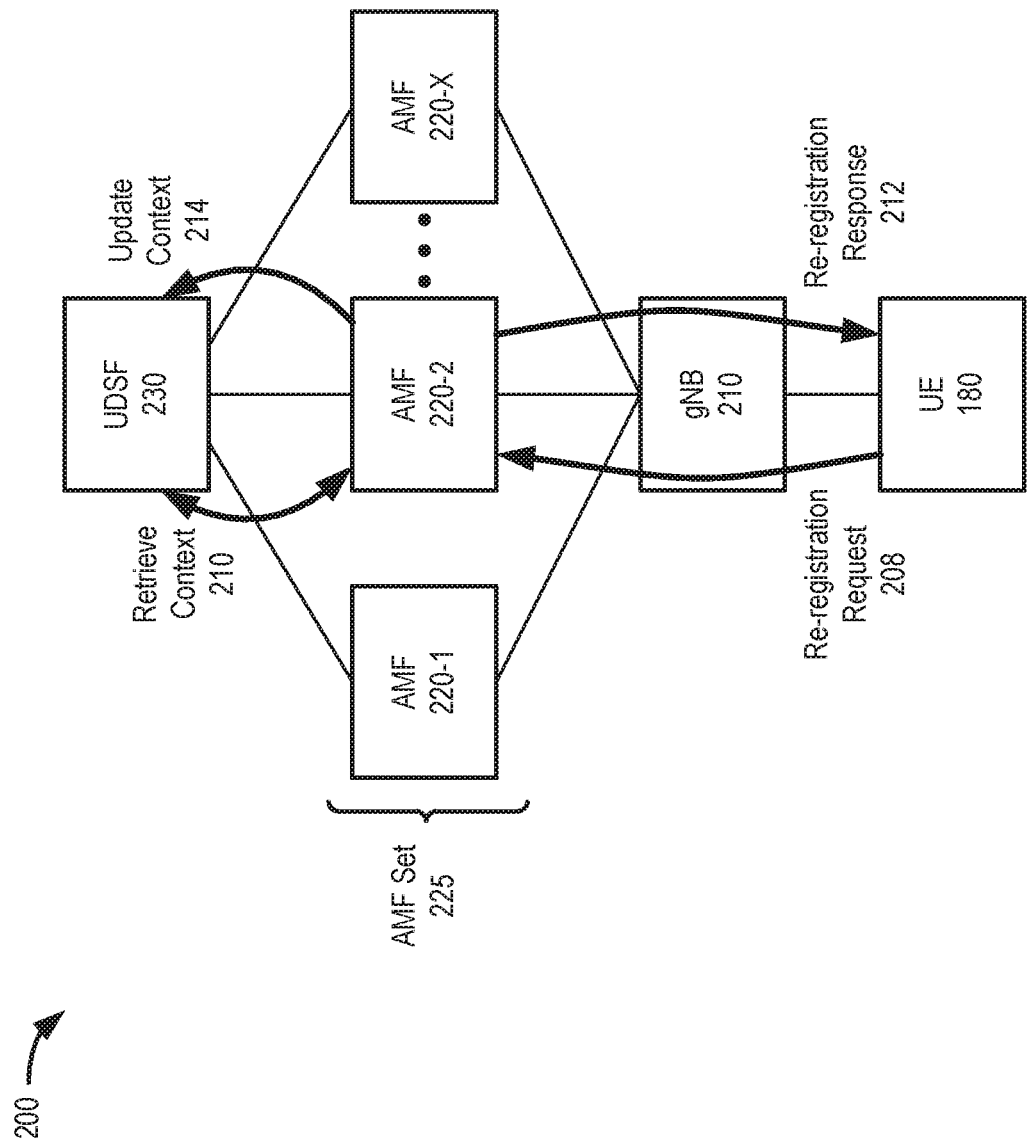

FIGS. 2A and 2B are diagrams illustrating an exemplary process of an embodiment of the stateless network function service according to an implementation. FIGS. 2A and 2B include a portion 200 of network environment 100. Network portion 200 includes UE 180; a gNB 210, which may correspond to one of wireless stations 110; a set of AMF instances 220-1 through 220-X, which may collectively form an AMF set 225; and a UDSF 230. AMF instances 220 and UDSF 230 may correspond to network devices 155 of FIG. 1. Generally, gNB 210 may connect with any of the AMF instances 220 in AMF set 225 to facilitate services for UE 180. To allow repeated connections of gNB 210 with any AMF instance 220 in AMF set 225, state information for UE 180 is stored, maintained, and updated at UDSF 230 and shared with AMF instances 220 when needed.

Referring to FIG. 2A, assume, after establishing a connection with gNB 210, that UE 180 and AMF instance 220-1 conduct a registration procedure 202, such as for an application or service that requires context. Based on the registration information, AMF instance 220-1 may identify state maintenance parameters needed for maintaining context for UE 180. AMF instance 220-1 may forward 204 the state maintenance parameters to UDSF 230. The state maintenance parameters may include vendor-specific formatting and/or fields. The state maintenance parameters may include, for example, settings for an array of timers to be run on the context, an array of applicable context states, and/or access controls on the context. Settings for each timer may include, for example, a timer ID, a timer value, a grace period, a callback address, actions to be taken upon time expiry, and/or actions to be taken upon grace period expiry. The applicable context states may include, for example, a state identity and a state value for each state. The access controls may include read permission parameters, update/delete permission parameters, and/or context lock permissions.

UDSF 230 may receive the state maintenance parameters and may execute the parameters 206 to maintain state information for UE 180. Thus, according to implementations described herein, each AMF instance 220 may remain stateless, while UDSF 230 may actively maintain state information for each UE 180, such as actions to start, reset, and/or monitor timers and report timer conditions.

Referring to FIG. 2B, assume that after an initial registration, UE 180 submits a re-registration request 208, which is forwarded by gNB 210 to a different AMF instance 220 (e.g., AMF instance 220-2) than was used in registration process 202 of FIG. 2A. AMF instance 220-2 may retrieve context 210 for UE 180 from UDSF 230. The context may include state information based on the parameters being executed by UDSF 230. AMF instance 220-2 may use the retrieved context to provide a re-registration response 212 to UE 180. In conjunction with the re-registration response, AMF instance 220-2 may update context 214 for UE 180. The updated context may cause UDSF 230 to restart timers, update a count, change a status, etc., for UE 180.

Although FIGS. 2A-2B illustrate an exemplary process of the stateless network function service, according to other exemplary embodiments, the process may include additional, different, and/or fewer steps. Also, although FIGS. 2A and 2B describe a stateless network function service in the context of a single UE 180, AMF set 225 may typically support context information for thousands of simultaneous UE connections.

Figure 3:
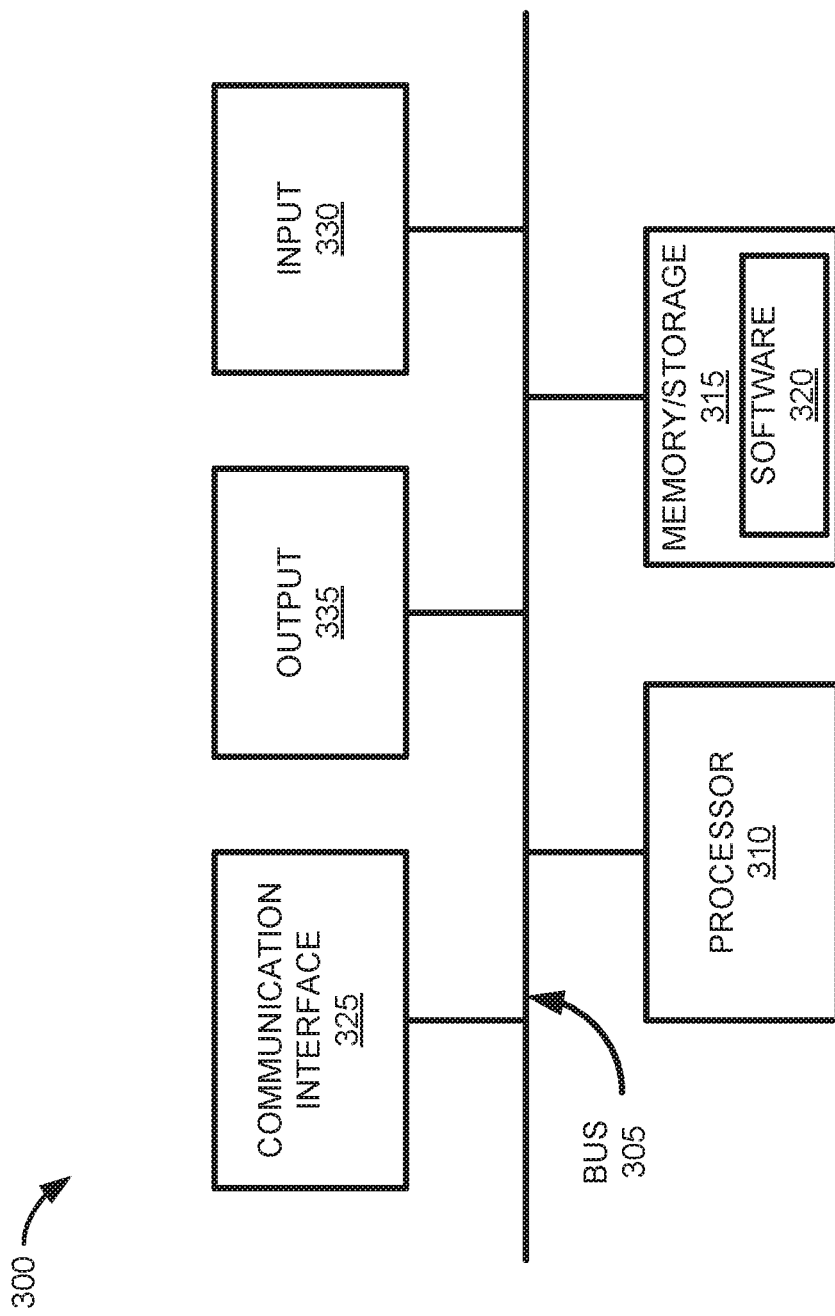
FIG. 3 is a diagram illustrating exemplary components of a device that may correspond to one or more of the devices illustrated and described herein.

FIG. 3 is a diagram illustrating example components of a device 300 according to an implementation described herein. Wireless station 110 (including gNB 210), network device 155 (including AMF instance 220 or UDSF 230), and/or UE 180 may each include one or more devices 300. In another implementation, a device 300 may include multiple network functions. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, AMF instance 220 and/or UDSF 230 may include logic to perform tasks, as described herein, based on software 320. Furthermore, UE 180 may store applications that require services/resources from AMF set 225 and/or UDSF 230.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a communication standard and/or protocols. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4B:
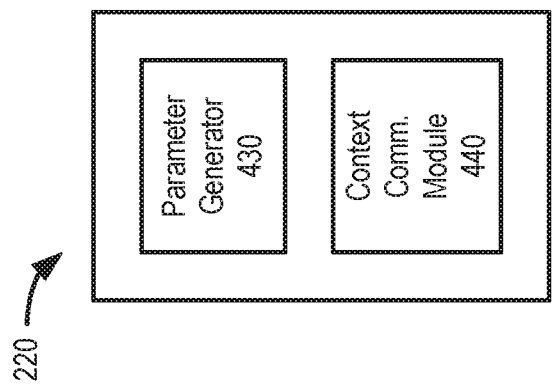
FIG. 4B is a functional block diagram of components implemented in an Access and mobility Management Function (AMF) of FIGS. 2A and 2B.
Figure 4A:
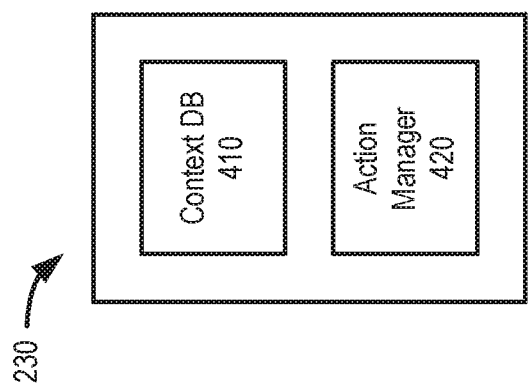
FIG. 4A is a functional block diagram of components implemented in an Unstructured Data Storage Function (UDSF) of FIGS. 2A and 2B.

FIG. 4A is an exemplary functional block diagram of components implemented in UDSF 230. In one implementation, all or some of the components illustrated in FIG. 4A may be implemented in a distributed network of devices, each with a processor 310 executing software instructions 320 stored in memory/storage 315. In another implementation, UDSF 230 may include a centralized component executing software instructions 320 stored in memory/storage 315. As shown in FIG. 4A, UDSF 230 may include a context database (DB) 410 and an action manager 420.

Context database 410 generally may store context information (e.g., in a vendor-specified format, a generic format, or no format) and context parameters for the context information. Context database 410 may receive and store context information and state maintenance parameters for UE 180 from AMF set 225 (e.g., one of AMF instances 220). The state maintenance parameters may include, for example, one or more timer values associated with UE 180 (e.g., re-registration timers, purge timers, etc.), an action to be performed upon expiry of the timer values (e.g., notify AMF set 225, change the UE state, etc.). In another implementation, the state maintenance parameters may also include access controls to the context. According to one implementation, context database 410 may associate context information with a data identifier that uniquely identifies the data for UE 180.

Action manager 420 may maintain state information for UEs based on state maintenance parameters. Action manager 420 may execute timer starts, stops, restarts, etc., and report on timeouts based on the stored state maintenance parameters. Action manager 420 may also respond to queries from AMF set 225 to provide state information for a UE 180. In other implementations, action manager 420 may update state information for a UE 180, notify AMF set 225 of a timer expiry, and/or reset one or more timers. Action manager 420 may apply access controls to, for example, enforce read permissions (e.g., to a particular vendor), update/delete permission parameters based on instructions from AMF set 225, and/or lock context permissions. For example, in one embodiment, action manager 420 may receive a query with a vendor identifier; and compare the vendor identifier with the access control parameters before responding with a UE context.

FIG. 4B is an exemplary functional block diagram of components implemented in AMF instance 220. In one implementation, all or some of the components illustrated in FIG. 4B may be implemented by a processor 310 executing software instructions 320 stored in memory/storage 315. Generally, AMF instance 220 may perform registration management, connection management, reachability management, mobility management, lawful intercepts, session management, access authentication and authorization, location services management, functionality to support non-3GPP access networks, and/or other types of management processes. As shown in FIG. 4B, AMF instance 220 may include a parameter generator 430 and a context communication module 440.

Parameter generator 430 may establish state maintenance parameters for each UE 180, create updated state maintenance parameters for UE 180, and retrieve context (e.g., from UDSF 230) for UE 180. Parameter generator 430 may identify state maintenance parameters that need to be fulfilled by UDSF 230.

Context communication module 440 may generate and send context creation requests, context update requests, and context query requests for UDSF 230. Context communication module 440 may include state maintenance parameters in the context creation requests and/or context update requests to provide instructions to UDSF 230.

Although FIGS. 4A and 4B show exemplary logical components of different devices in network portion 200, in other implementations, these devices may include fewer logical components, different logical components, additional logical components or differently-arranged logical components than depicted in FIGS. 4A and 4B. For example, in one implementation, one or more logical components of AMF instance 220 may be performed by another network function in core network 150.

Figure 5:
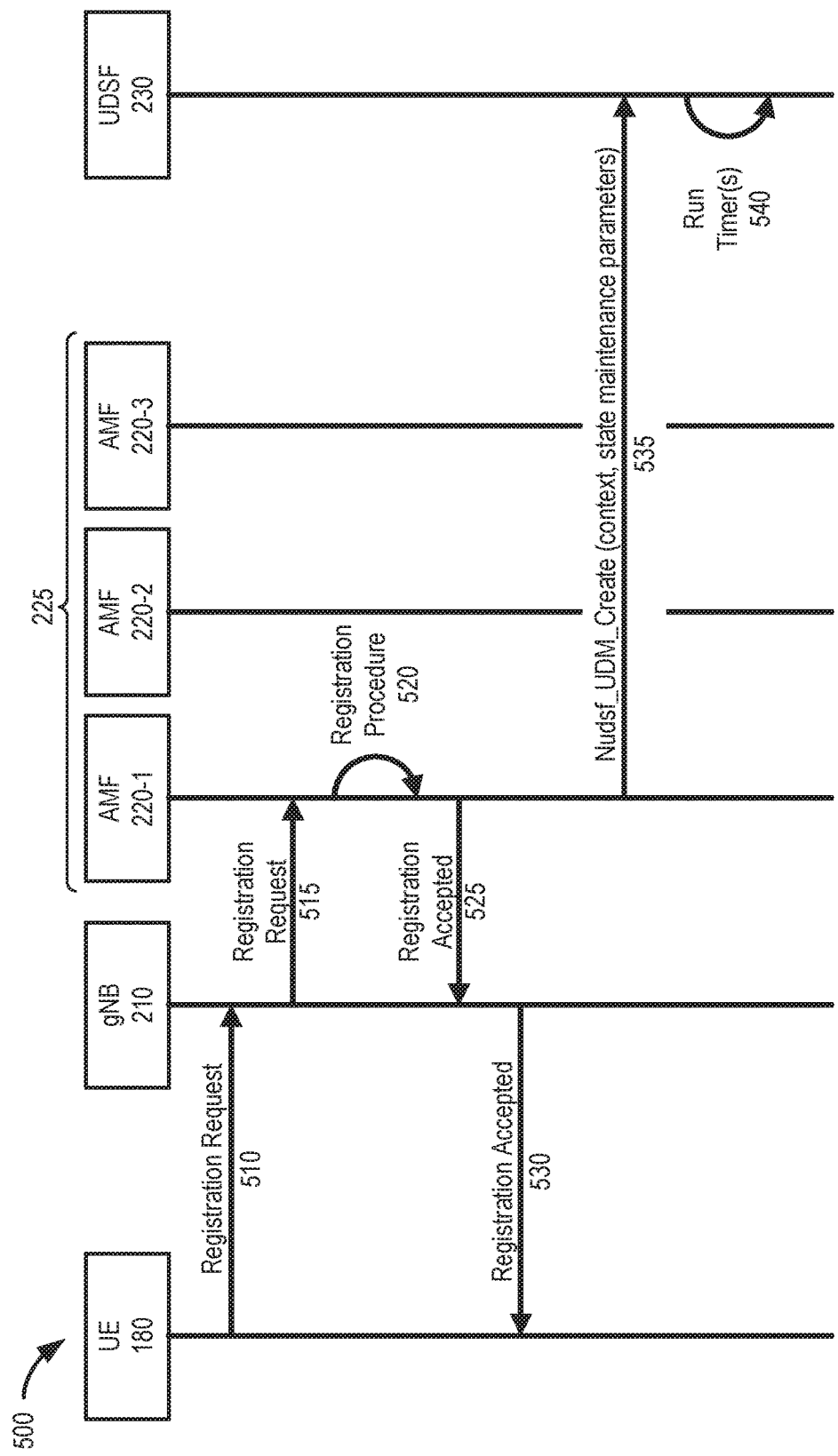
FIG. 5 is a signal flow diagram illustrating exemplary communications for creating session context among devices in the network portion of FIGS. 2A and 2B.

FIG. 5 is a diagram illustrating exemplary communications for creating session context among devices in a portion 500 of network environment 100. Network portion 500 may include UE 180; gNB 210; AMF set 225 including AMF instances 220-1, 220-2, and 220-3; and UDSF 230. Communications shown in FIG. 5 provide simplified illustrations of communications in network portion 500 and are not intended to reflect every signal or communication exchanged between devices. In the example of FIG. 5, AMF instance 220-1 may handle a registration procedure for UE 180 and create context for UE 180 in UDSF 230. Two timers used by AMF instance 220-1 in relation to the registration process include a re-registration timer and a purge timer.

As shown in FIG. 5, UE 180 may submit a registration request 510 (such as a registration request for a radio resource control (RRC) procedure) to gNB 210, and gNB 210 may forward a registration request 515 to AMF set 225. Assume registration request 515 is directed to AMF instance 220-1, AMF instance 220-1 performs a registration procedure 520, and registration request 515 is accepted. AMF instance 220-1 may provide a registration accepted message 525 to gNB 210, which in turn forwards registration accepted message 530 to UE 180.

In conjunction with registration procedure 520, AMF instance 220-1 may set state maintenance parameters for the UE 180 session. Generally, the state maintenance parameters may identify one or more timers applicable for monitoring UE context and actions to be taken when the timers expire. The state maintenance parameters may identify the number of timers used, timer types, time limits/values, grace periods, a callback address to be used for notifications (e.g., a fully qualified domain name (FQDN), IP address, etc.), and/or particular actions to be taken. The state maintenance parameters may also identify context states (e.g., active, not active, etc.,) that may be applied to a particular UE. An example set of state maintenance parameters is provided below:

Array of timers—length of array—2
  Item 1
    Identity: Rereg timer
    Value: 3600 seconds
    Grace period: 60 seconds
    Callback address: FQDN of AMF Set
    Action to be taken upon timer expiry: Callback AMF Set
    Action to be taken upon grace period expiry: Mark context as not Active
  Item 2
    Identity: Purge timer
    Value: 3 months
    Grace period: 1 hour
    Callback address: FQDN of AMF Set
    Action to be taken upon timer expiry: Callback AMF Set
    Action to be taken upon grace period expiry: Delete context
Array of application context states—length of array—1
  Item 1
    Identity: Active
    Value: Boolean Set/Not Set AMF instance 220-1 may include the state maintenance parameters in a unified data management message (e.g., Nudsf_UDM_Create message 535) that AMF instance 220-1 sends to UDSF 230 (e.g., via a Nudsf interface). Upon receiving Nudsf_UDM_Create message 535 with the state maintenance parameters, UDSF 230 may run 540 the designated timers. For example, UDSF 230 may start the timers identified in the array of timers (e.g., the "Rereg timer" and the "Purge timer") from the state maintenance parameters.

Figure 6:
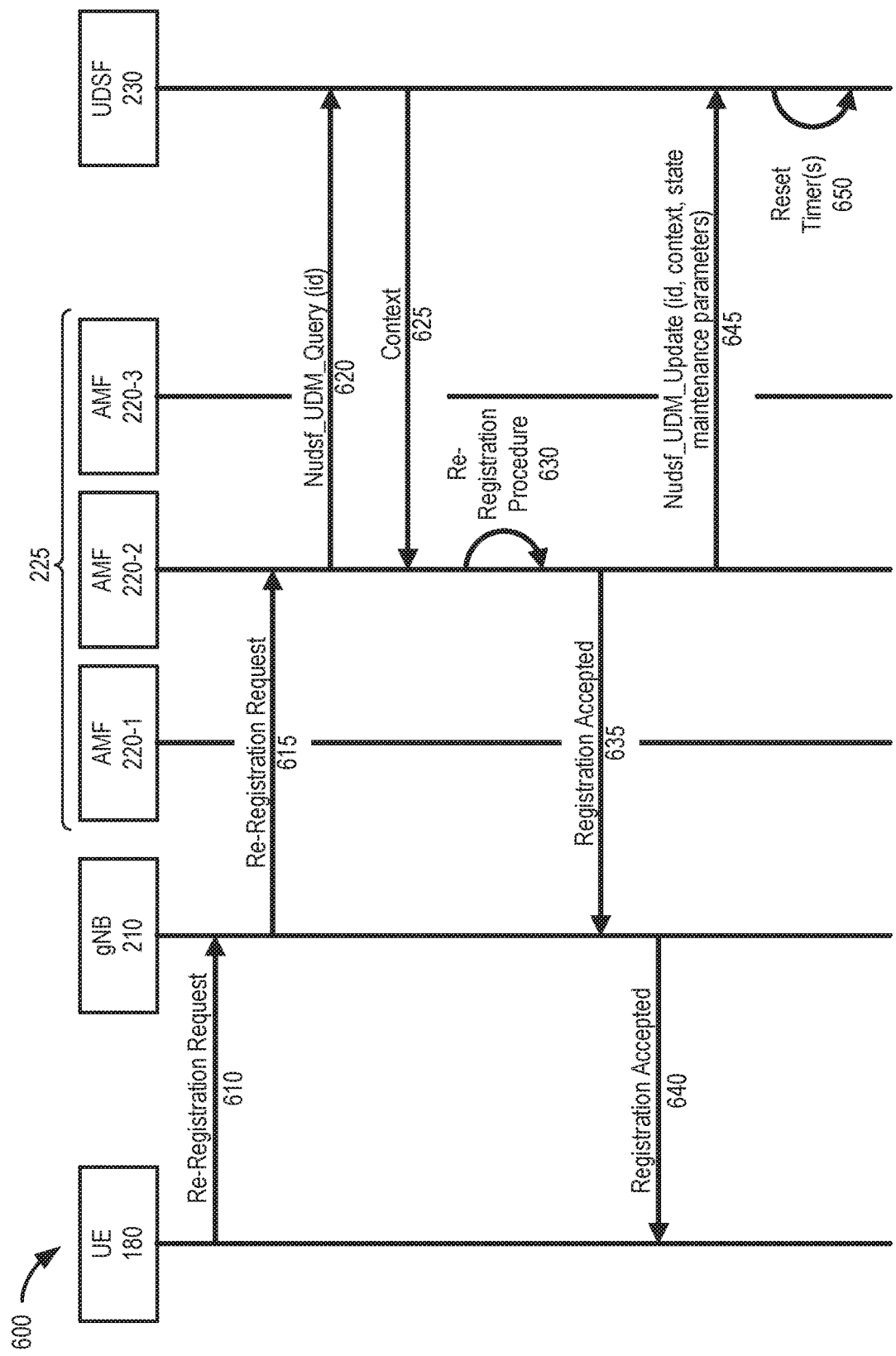
FIG. 6 is a signal flow diagram illustrating exemplary communications for retrieving and resetting context maintenance parameters among devices in the network portion of FIGS. 2A and 2B.

FIG. 6 is a diagram illustrating exemplary communications for retrieving session context among devices in network portion 500. Communications shown in FIG. 6 provide simplified illustrations of communications in network portion 500 and are not intended to reflect every signal or communication exchanged between devices. In the example of FIG. 6, AMF instance 220-2 may handle a re-registration procedure for UE 180 relative to the context from the registration procedure described in connection with FIG. 5.

As shown in FIG. 6, UE 180 may submit a re-registration request 610 (such as a re-registration request for a RRC procedure) to gNB 210, and gNB 210 may forward a re-registration request 615 to AMF set 225. Assume re-registration request 615 is directed to AMF instance 220-2, which receives re-registration request 615 before the "Rereg timer" (e.g., initiated in FIG. 5 and running on UDSF 230) expires. AMF instance 220-2 provides a Nudsf_UDM_Query message 620 to UDSF 230. Nudsf_UDM_Query message 620 may include an identifier (id) for the particular UE 180 and/or data for which context is required.

In response to receiving Nudsf_UDM_Query message 620, UDSF 230 may provide stored context information 625 for UE 180 to AMF instance 220-2. Using the context information 625, AMF instance 220-2 may perform a re-registration procedure 630 accepting re-registration request 615. AMF instance 220-2 may provide a re-registration accepted message 635 to gNB 210, which in turn forwards re-registration accepted message 640 to UE 180.

In conjunction with re-registration procedure 630, AMF instance 220-2 may update state maintenance parameters for the UE 180 session. For example, AMF instance 220-2 may reset the re-registration and purge timers (e.g., the "Rereg timer" and the "Purge timer" from the state maintenance parameters of FIG. 5) while updating the UE context in UDSF 230. AMF instance 220-2 may send a Nudsf_UDM_Update message 645 with the data identifier (id), context, and state maintenance parameters for the UE 180 session.

Upon receiving Nudsf_UDM_Update message 645 with the state maintenance parameters, UDSF 230 may reset 650 the designated timers. For example, UDSF 230 may reset the timers identified in the array of timers (e.g., the "Rereg timer" and the "Purge timer") from the state maintenance parameters to initial values and begin the timer cycle.

Figure 7:
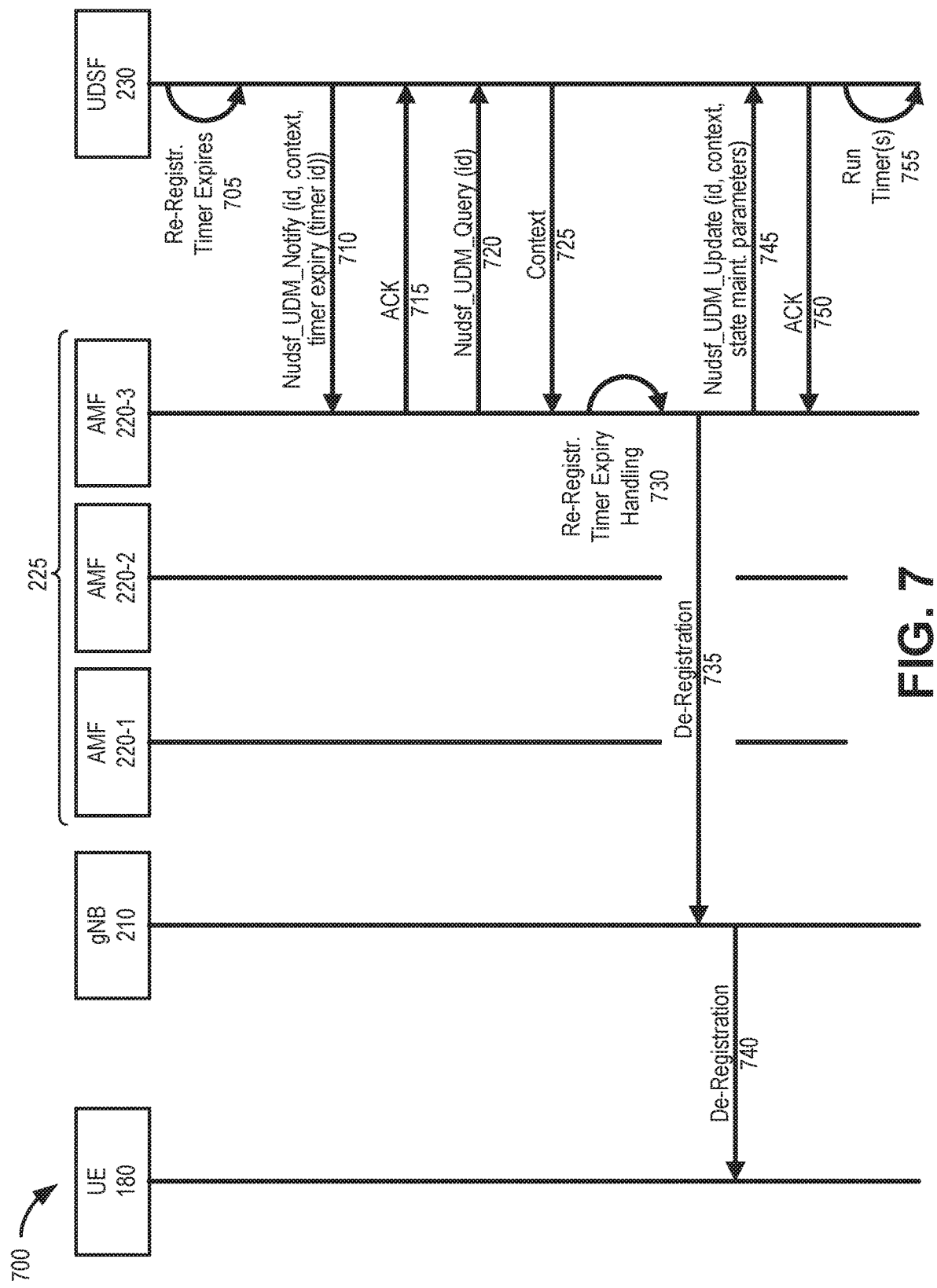
FIG. 7 is a signal flow diagram illustrating exemplary communications for responding to timer expiration among devices in the network portion of FIGS. 2A and 2B.

FIG. 7 is a diagram illustrating exemplary communications for retrieving session context among devices in network portion 500. Communications shown in FIG. 7 provide simplified illustrations of communications in network portion 500 and are not intended to reflect every signal or communication exchanged between devices. In the example of FIG. 7, AMF instance 220-3 may handle a de-registration procedure for UE 180 relative to the context from the registration procedure described in connection with FIG. 5. Generally, if a re-registration timer expires UDSF 230 may inform AMF set 225. None of the AMF instances 220 take any action and UDSF 230 takes the action identified upon grace period expiry. In this case, UDSF 230 may mark the context as inactive.

As shown in FIG. 7, UDSF 230 may detect 705 that a re-registration timer (e.g., "Rereg timer") from Nudsf_UDM_Create message 535 (FIG. 5) or Nudsf_UDM_Update message 645 (FIG. 6) has expired. In response to detecting the timer expiration, UDSF 230 may refer to state maintenance parameters to generate a Nudsf_UDM_Notify message 710 for AMF set 225. Nudsf_UDM_Notify message 710 may include an identifier (id) for the particular UE and/or data, context (e.g., still active, pending the grace period), and an expiration indication for a particular timer (e.g., "Rereg timer").

UDSF 230 may forward Nudsf_UDM_Notify message 710 to AMF set 225. Assume Nudsf_UDM_Notify message 710 is directed to AMF instance 220-3. AMF instance 220-3 may receive Nudsf_UDM_Notify message 710, and, in response, provide an acknowledgement message (ACK) 715 to UDSF 230. According to one implementation, AMF instance 220-3 may also provide a Nudsf_UDM_Query message 720 to UDSF 230 (e.g., after the grace period). Nudsf_UDM_Query message 720 may include an identifier (id) for the particular UE 180 and/or data which has the expired re-registration timer. In response to Nudsf_UDM_Query message 720, UDSF 230 may provide context information 725 for the UE 180 session to AMF instance 220-3. Context information 725 may include, for example, updated context as not active for the UE 180 session, assuming the grace period has expired.

In response to Nudsf_UDM_Notify message 710 and/or context information 725, AMF instance 220-3 may perform re-registration timer expiry handling 730 and provide a deregistration message 735 to gNB 210. In response to de-registration message 735, gNB 210 may provide a de-registration message 740 to UE 180. In conjunction with re-registration timer expiry handling 730, AMF instance 220-3 may update state maintenance parameters for the UE 180 session. For example, AMF instance 220-3 may reset the purge timers and update the UE context in UDSF 230. AMF instance 220-3 may send a Nudsf_UDM_Update message 745 with the data identifier (id), context (e.g., designating a not active state), and state maintenance parameters for the UE 180 session. In response to Nudsf_UDM_Update message 745, UDSF 230 may provide an acknowledgement message (ACK) 750 to AMF instance 220-3, and run the appropriate timers 755. For example, UDSF 230 may continue to track "Purge timer" for the UE 180 session.

The communications in FIGS. 5-7 provide examples for enabling network functions (e.g., AMF set 225) to be stateless while adding new functionality to UDSF 230. This new functionality provided by UDSF 230 is generic and is not specific to any network function. In other implementations, different communications may be used to enable stateless network functions in AMF set 225. Additionally, variations in the order of communications in FIGS. 5-7 are possible.

FIG. 8 is a flow diagram illustrating an exemplary process 800 for performing a stateless network function service, according to an implementation described herein. In one implementation, process 800 may be implemented by UDSF 230. In another implementation, process 800 may be implemented by UDSF 230 in conjunction with one or more AMF instances 220 of AMF set 225.

Referring to FIG. 8, process 800 may include generating and sending state maintenance parameters for a UE (block 805). For example, an AMF instance 220 may receive a registration request from UE 180 and generate context and state maintenance parameters for the UE 180. AMF instance 220 may forward the context and state maintenance parameters to UDSF 230 for storage and implementation.

Process 800 may also include receiving the UE context and state maintenance parameters (block 810), and storing the UE context and state maintenance parameters (block 815). For example, UDSF 230 may receive a unified data management message (e.g., Nudsf_UDM_Create message 535) from AMF instance 220. The unified data management message may include the UE context and the state maintenance parameters for UE 180. UDSF 230 may store the UE context and the state maintenance parameters associated with a unique identifier (which may be any alpha numeric string or a set of characters derived from a UE identifier, such as such as an International Mobile Subscriber Identity (IMSI) or a Mobile Station International Subscriber Directory Number (MSISDN)).

Process 800 may further include applying the state maintenance parameters (block 820) and determining if a timer expiry occurs (block 825). For example, upon receiving the unified data management message (e.g., Nudsf_UDM_Create message 535) with the state maintenance parameters, UDSF 230 may run the designated timers indicated in the state maintenance parameters. For example, UDSF 230 may start an array of timers (e.g., the "Rereg timer" and the "Purge timer") from the state maintenance parameters and monitor the different timers for expiration.

If a timer expiry does not occur (block 825—No), process 800 may return to block 820 to continue to apply the state maintenance parameters. If a timer expiry is detected (block 825—Yes), process 800 may additionally include performing an action and/or notification based on the state maintenance parameters (block 830). For example, in response to detecting a timer expiration, UDSF 230 may refer to state maintenance parameters to generate a notification message (e.g., Nudsf_UDM_Notify message 710) for AMF set 225. The notification message may include an identifier for the particular UE and/or data set, context (e.g., active or not active), and an expiration indication for a particular timer. In another example, UDSF 230 may change a UE state based on a timer expiry and state maintenance parameters.

Systems and methods described herein provide a stateless network function service for 5G cellular networks that enhances the UDSF to support context-related characteristics so that network functions, such as AMF instances, can be truly stateless. The systems and methods may entail changes to 3GPP specifications, for example, to change Unstructured Data Management service operations via a Nudsf interface. For example, a Nudsf_UnstructuredData-Management_Create service operation may be modified to include optional inputs of state maintenance parameters, where the state maintenance parameters may include any of the parameters described above.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment (s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks and signal flows have been described with regard to the processes illustrated in FIGS. 5-8, the order of the signal flows and blocks may be modified according to other embodiments. Further, non-dependent signals and/or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A network device, comprising:
a communications interface configured to exchange data with a set of multiple stateless network function instances in a wireless core network;
one or more memories to store instructions; and
one or more processors configured to execute the instructions to:
receive, from a first instance of the set of multiple stateless network function instances and via the communications interface, context information and state maintenance parameters for an end device that is not the network device, wherein the state maintenance parameters include:
one or more timer values for the end device, and
an action to be performed by the network device upon expiry of the one or more timer values,
store, in the one or more memories, the context information and the state maintenance parameters,
apply the state maintenance parameters to the context information for the end device, and
perform the action when expiry of the one or more timer values is detected.

2. The network device of claim 1, wherein the one or more processors are further configured to execute the instructions to:
receive, from a second instance of the set of multiple stateless network function instances, a context query for the end device, and
provide, to the second instance, context information for the end device based on the state maintenance parameters.

3. The network device of claim 1, wherein the one or more processors are further configured to execute the instructions to:
receive, from a third instance of the set of multiple stateless network function instances, updated state maintenance parameters for the end device, and
apply the updated state maintenance parameters for the end device.

4. The network device of claim 1, wherein the network device includes an unstructured data storage function (UDSF) of a unified data management (UDM) device.

5. The network device of claim 4, wherein the set of multiple stateless network function instances includes an access and mobility management function (AMF) for the wireless core network.

6. The network device of claim 1, wherein the state maintenance parameters further include parameters for a context state of the end device.

7. The network device of claim 1, wherein the state maintenance parameters further include access control parameters for the context information and state maintenance parameters.

8. The network device of claim 1, wherein, when applying the state maintenance parameters to the context information, the one or more processors are further configured to execute the instructions to:
initiate, one or more timers with the one or more timer values, and
monitor the one or more timers for the end device.

9. The network device of claim 1, wherein, when performing the action, the one or more processors are further configured to execute the instructions to:
send, to the set of multiple stateless network function instances, a notification of the expiry of the one or more timer values, or
change a context state for the end device.

10. A method, comprising:
receiving, by a network device and from a first network function instance in a set of multiple stateless network function instances, context information and state maintenance parameters for an end device using a wireless network, wherein the state maintenance parameters include:
one or more timer values for the end device, and
an action to be performed by the network device upon expiry of the one or more timer values;
storing, by the network device in one or more memories, the context information and the state maintenance parameters;
applying, by the network device, the state maintenance parameters to the context information for the end device; and
performing, by the network device, the action when expiry of the one or more timer values is detected.

11. The method of claim 10, wherein the set of multiple stateless network function instances do not monitor the state of the end device.

12. The method of claim 10, wherein the network device comprises an unstructured data storage function (UDSF) for the wireless network.

13. The method of claim 10, further comprising:
receiving, from a second network function instance of the set of multiple stateless instances, a context query for the end device, and
providing, to the second network function instance, context information for the end device based on the state maintenance parameters.

14. The method of claim 10, further comprising:
receiving, from a third network function instance of the set of multiple stateless instances, updated state maintenance parameters for the end device, and
applying, the updated state maintenance parameters to the context, for the end device.

15. The method of claim 10, wherein the state maintenance parameters further include access control parameters for the context information and state maintenance parameters, and wherein the method further comprises:
receiving a query with a vendor identifier; and
comparing the vendor identifier with the access control parameters.

16. The method of claim 10, wherein applying the state maintenance parameters to the context information further comprises:
running one or more timers with the one or more timer values.

17. A system comprising:
a network device including:
a communications interface configured to exchange data with a set of multiple stateless network function instances in a wireless core network;
one or more first memories configured to store first instructions; and
one or more first processors configured to execute the first instructions to:
receive, from a first instance of the set of multiple stateless network function instances and via the communications interface, context information and state maintenance parameters for an end device using the network, wherein the state maintenance parameters include:
one or more timer values for the end device, and
an action to be performed by the network device upon expiry of the one or more timer values,
store, in the one or more memories, the context information and the state maintenance parameters,
apply the state maintenance parameters to the context information for the end device, and
perform the action when expiry of the one or more timer values is detected.

18. The system of claim 17, further comprising:
the first instance of the set of multiple stateless network function instances, wherein the first instance comprises:
a second communications interface for exchanging data with the network device;
one or more second memories to store second instructions; and
one or more second processors configured to execute the second instructions to:
generate the state maintenance parameters based on a registration request from the end device.

19. The system of claim 18, wherein the one or more first processors are configured to execute the first instructions to:
receive, from the first instance, a context query for the end device, and
provide, to the first instance, context information for the end device based on the state maintenance parameters.

20. The system of claim 18, wherein the one or more second processors are configured to execute the second instructions to:
receive, from a wireless station, a registration request that requires state information for the end device,
generate, based on the registration request, a unified data management message to store the context information and state maintenance parameters for the end device, and
send the unified data management message to the network device.

* * * * *